US009742928B2

(12) United States Patent
Kiss

(10) Patent No.: US 9,742,928 B2
(45) Date of Patent: Aug. 22, 2017

(54) CHARGING INFORMATION FOR WLAN NETWORK SELECTION IN 3GPP-WLAN DATA OFFLOADING

(71) Applicant: Apple Inc., Cupertino, CA (US)

(72) Inventor: Krisztian Kiss, Hayward, CA (US)

(73) Assignee: Apple Inc., Cupertino, CA (US)

( * ) Notice: Subject to any disclaimer, the term of this patent is extended or adjusted under 35 U.S.C. 154(b) by 34 days.

(21) Appl. No.: 14/690,824

(22) Filed: Apr. 20, 2015

(65) Prior Publication Data

US 2015/0312808 A1   Oct. 29, 2015

Related U.S. Application Data

(60) Provisional application No. 61/984,969, filed on Apr. 28, 2014.

(51) Int. Cl.
*H04W 36/00* (2009.01)
*H04W 4/24* (2009.01)
(Continued)

(52) U.S. Cl.
CPC .... *H04M 15/8038* (2013.01); *H04L 12/1407* (2013.01); *H04W 4/24* (2013.01);
(Continued)

(58) Field of Classification Search
None
See application file for complete search history.

(56) References Cited

U.S. PATENT DOCUMENTS 8,249,505 B1   8/2012   Goldner et al.

2010/0173623 A1   7/2010   Takami
(Continued)

FOREIGN PATENT DOCUMENTS

JP   2010161657   7/2010
WO   WO 2014/017630   1/2014
(Continued)

OTHER PUBLICATIONS

"3rd Generation Partnership Project; Technical Specification Group Services and System Aspects; Architecture Enhancements for non-3GPP Accesses", 3GPP TS 23.402, v12.8.0, Mar. 2015, pp. 1-290.
(Continued)

*Primary Examiner* — Chi H Pham
*Assistant Examiner* — Soon-Dong D Hyun
(74) *Attorney, Agent, or Firm* — Meyertons Hood Kivlin Kowert & Goetzel, P.C.; Jeffrey C. Hood; Matthew C. Washburn

(57) ABSTRACT

A user equipment (UE) may receive charging data and use the charging data in determinations of whether to offload data from a mobile communication network, such as a 3GPP cellular network, to another wireless access network, such as a wireless local area network (WLAN). For example, the UE may receive, from the mobile communication network, charging data regarding one or more WLANs in the vicinity of the UE. The UE may also receive rules regarding whether to offload communication traffic from the cellular communication network to a particular WLAN based on charging data relating to the particular WLAN. The UE may detect one of the WLANs and determine whether to offload communication traffic to the WLAN based at least in part on the received rules and the received charging data regarding the WLAN. The determination may be further based on user preferences saved on the UE regarding the charging data.

19 Claims, 10 Drawing Sheets

(51) Int. Cl.
*H04W 48/16* (2009.01)
*H04M 15/00* (2006.01)
*H04W 48/14* (2009.01)
*H04L 12/14* (2006.01)
*H04W 48/18* (2009.01)
*H04W 36/14* (2009.01)

(52) U.S. Cl.
CPC .......... *H04W 48/14* (2013.01); *H04M 15/745* (2013.01); *H04M 15/8027* (2013.01); *H04M 15/8044* (2013.01); *H04M 15/8055* (2013.01); *H04M 15/83* (2013.01); *H04M 15/8351* (2013.01); *H04M 15/84* (2013.01); *H04M 15/858* (2013.01); *H04W 36/14* (2013.01); *H04W 48/16* (2013.01); *H04W 48/18* (2013.01)

(56) References Cited

U.S. PATENT DOCUMENTS

| | | | | |
|---|---|---|---|---|
| 2014/0079022 A1* | 3/2014 | Wang | .................... | H04W 36/22 370/331 |
| 2014/0098724 A1* | 4/2014 | Park | .................... | H04W 72/02 370/311 |
| 2014/0199994 A1* | 7/2014 | Richards | ............... | H04W 24/10 455/426.1 |
| 2014/0241183 A1* | 8/2014 | Comeau | ................ | H04L 5/0098 370/252 |
| 2015/0119101 A1* | 4/2015 | Cui | .................... | H04W 48/18 455/525 |
| 2016/0135100 A1* | 5/2016 | Teyeb | ............... | H04W 36/0055 370/331 |
| 2016/0192286 A1* | 6/2016 | Bergstrom | ............ | H04W 48/18 370/312 |

FOREIGN PATENT DOCUMENTS

WO         2014043500 A1     3/2014
WO     WO 2014/038193     3/2014

OTHER PUBLICATIONS

3rd Generation Partnership Project; Technical Specification Group Core Network and Terminals; Access Network Discovery and Selection Function (ANDSF) Management Object (MO), 3GPP TS 24.312, v12.8.0, Mar. 2015, pp. 1-375.

Japanese Office Action, Application No. 2015-088734, mailed Mar. 24, 2016, 9 pages.

3GPP, "3rd Generation Partnership Project; Technical Specification Group Services and System Aspects; Architecture enhancements for non-3GPP accesses", Release 12, 3GPP TS 23.402, V12.4.0, 15 pages.

3rd Generation Partnership Project; Technical Specification Group Services and System Aspects; Architecture enhancements for non-3GPP accesses (Release 12); 3GPP TS 23.402; V12.4.0; Mar. 2014; pp. 1-15.

3GPP ETSI TS 124 302 V9.3.0: Universal Mobile Telecommunications System (UMTS); LTE; Access to the 3GPP Evolved Packet Core (EPC) via non-3GPP access networks; Stage 3; Jun. 22, 2010; 6 pages.

Office Action (English translation), German Application No. 10 2015 207 438.2, dated Jun. 21, 2017, 6 pages.

* cited by examiner

CHARGING INFORMATION FOR WLAN NETWORK SELECTION IN 3GPP-WLAN DATA OFFLOADING

PRIORITY INFORMATION

This application claims priority to U.S. provisional patent application Ser. No. 61/984,969, entitled "Charging Information for WLAN Network Selection in 3GPP-WLAN Data Offloading," filed Apr. 28, 2014.

FIELD

The present application relates to wireless devices, and more particularly to a system and method for selectively offloading cellular data traffic onto a wireless LAN based at least partly on charging information.

DESCRIPTION OF THE RELATED ART

Wireless communication systems are rapidly growing in usage. Additionally, there exist numerous different wireless communication technologies and standards. Some examples of wireless communication standards include cellular communication technologies such as GSM, UMTS (WCDMA), 3GPP2 CDMA2000 (e.g., 1xRTT, 1xEV-DO, HRPD, eHRPD), LTE, and LTE Advanced (LTE-A). Another wireless communication technology is referred to as a wireless local area network (WLAN), such as IEEE 802.11 (i.e. Wi-Fi or wireless Ethernet). Other examples of wireless communication technologies include IEEE 802.16 (Wi-MAX), Bluetooth, and others.

Cellular communication networks such as those defined by the 3rd Generation Partnership Project (3GPP), may in many cases overlap with WLANs. In other words, a user may have a User Equipment (UE) operating in a cell of a cellular network and also be within range of a Wi-Fi hotspot of a WLAN.

In some cases, communication traffic may be offloaded from a cellular communication network to a WLAN, e.g., to ease congestion of the cellular communication network and/or to reduce data transfer costs incurred by the user. For example, 3GPP TS 23.402 v 12.8.0, incorporated by reference herein, specifies a service description for providing internet protocol (IP) connectivity using non-3GPP accesses, such as IEEE 802.11 networks, to the Evolved 3GPP packet switched (PS) Domain. Such offloading may be managed according to rules set by the cellular operator, as well as by user preferences associated with a specific user equipment (UE). However, in current systems no consideration is given to the relative cost differences between cellular communication and WLAN communication. In addition, in some cases the user may incur costs by transferring data via the WLAN. However, in the existing art, the user is not provided with information regarding such costs at the time when offloading decisions are made. Therefore, improvements are desired in the process of determining whether to offload data from a cellular network to a WLAN.

SUMMARY

Embodiments are presented herein of methods for providing charging data for use in offloading determinations, and for determining whether to selectively offload data from a mobile communication network, such as a 3GPP cellular network, to another wireless access network, such as a wireless local area network (WLAN) based at least in part on this charging data. Charging information may also be presented to the user to enable the user to understand, and perhaps more intelligently select, his communication method.

One embodiment provides a method for offloading communication traffic from a cellular communication network to a WLAN. For example, the method may be performed by a user equipment (UE) in communication with the cellular communication network. The UE may request information from the cellular communication network regarding WLANs in the vicinity of the UE. The UE may then receive the information from the cellular communication network, wherein the information comprises charging data regarding a first WLAN. The UE may further receive one or more rules from the cellular communication network regarding whether to offload communication traffic from the cellular communication network to a particular WLAN based on charging data relating to the particular WLAN. The UE may further detect the first WLAN, and determine whether to offload communication traffic from the cellular communication network to the first WLAN, based at least in part on the one or more rules and the charging data regarding the first WLAN.

In one embodiment, the determining whether to offload communication traffic from the cellular communication network to the first WLAN may be further based on one or more user preferences regarding the charging data relating to the first WLAN. For example, the one or more user preferences may be stored in a memory of the UE.

In either of the above embodiments, the method may further comprise displaying an image on a display of the UE, wherein the image indicates the charging data relating to the first WLAN. For example, the method may comprise displaying the image following the offloading of the communication traffic to the first WLAN, to notify the user of the current charging information.

Alternatively, the method may comprise displaying the image before offloading the communication traffic to the first WLAN. For example, the method may comprise displaying the image in response to determining to offload the communication traffic from the cellular communication network to the first WLAN, e.g., with a request for the user to authorize the offloading. The method may further comprise receiving, via an input device of the UE, an instruction to offload the communication traffic from the cellular communication network to the first WLAN, wherein the instruction may be required to authorize the UE to offload the communication traffic to the first WLAN.

Another embodiment provides a UE configured to perform any of the above methods.

Another embodiment provides a method for offloading communication traffic from a cellular communication network to a wireless local area network (WLAN). For example, the method may be performed by an Access Network Discovery and Selection Function (ANDSF) of a cellular core network. The method may comprise receiving a request from the UE for information regarding one or more WLANs in the vicinity of the UE; detecting a location of the UE; providing the information to the UE, wherein the information comprises charging data regarding the one or more WLANs; and providing one or more rules to the UE regarding whether to offload communication traffic from a cellular communication network to a WLAN, wherein the one or more rules specify behaviors based on the charging data.

Yet another embodiment provides an ANDSF configured to perform the above method.

Yet another embodiment provides a non-transitory computer-readable memory medium comprising program instructions executable by a processor of a wireless communication device to cause the wireless communication device to perform any of the above methods.

In any of the preceding embodiments, the one or more WLANs may be HotSpot 2.0 compatible networks. Additionally, the information provided to the UE may comprise at least one of: a list of preferred roaming partners; and a list of preferred radio access network identifiers. For example, the information may comprise a list of preferred roaming partners including WLANs that are HotSpot 2.0 compatible networks. The information may additionally, or alternatively, comprise a list of preferred radio access network identifiers including WLANs that are not HotSpot 2.0 compatible networks.

any of the preceding embodiments, the charging data may comprise data specifying whether billing of traffic offloaded from the cellular communication network to at least a first WLAN of the one or more WLANs will be: free, conducted according to a wireless data plan relating to use of a home network, or conducted according to a wireless data plan relating to use of a roaming network.

The techniques described herein may be implemented in and/or used with a number of different types of devices, including but not limited to Access Network Discovery and Selection Function (ANDSF) entities and/or other cellular core network entities, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
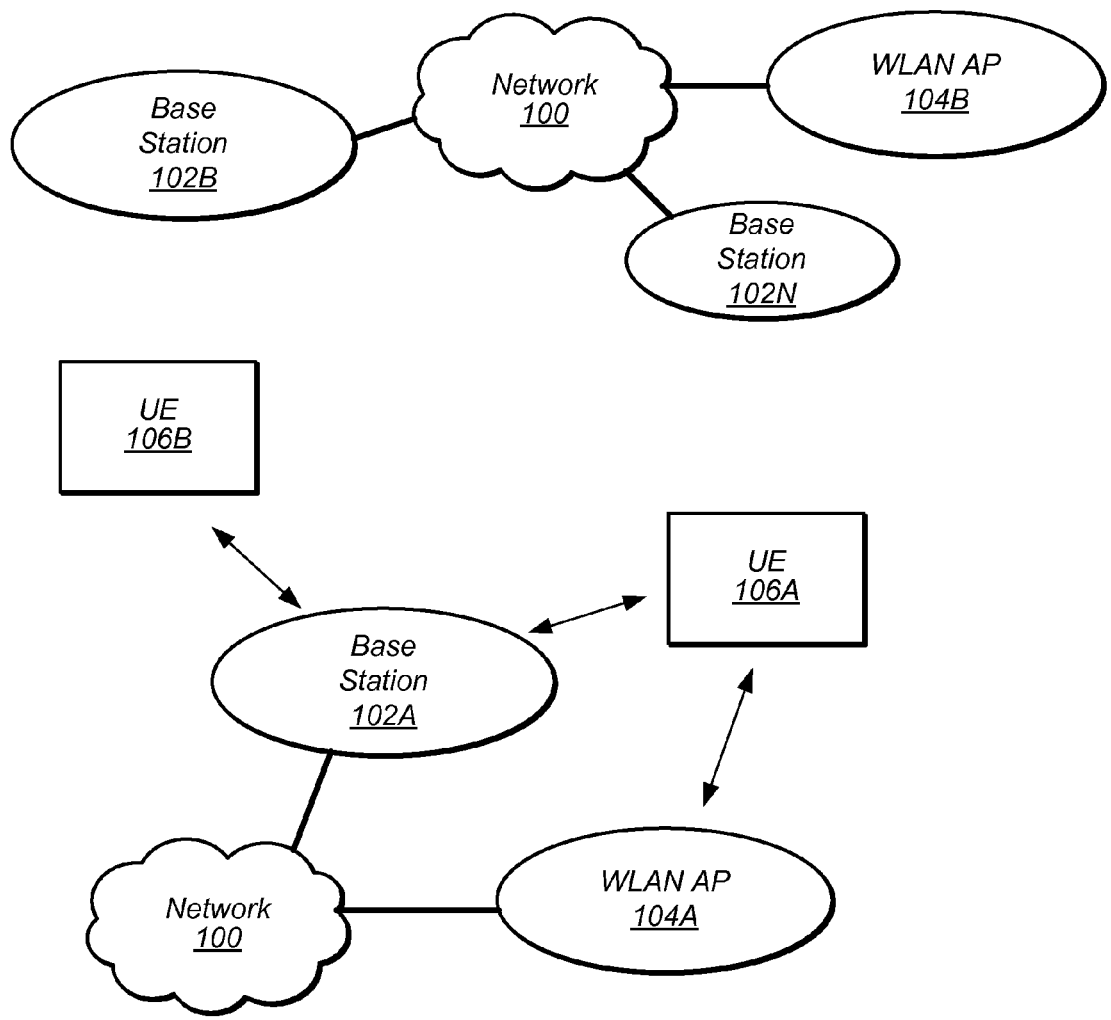
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

The following acronyms are used in the present disclosure.

3GPP: Third Generation Partnership Project
3GPP2: Third Generation Partnership Project 2
ANDSF: Access Network Discovery and Selection Function
EPC: Evolved Packet Core
EPS: Evolved Packet Service
E-UTRAN: Evolved UMTS Radio Access Network or Evolved Universal Radio Access Network
GERAN: GSM EDGE Radio Access Network
GSM: Global System for Mobile Communications
HSS: Home Subscriber Server
LTE: Long Term Evolution
MME: Mobility Management Entity
OMA: Open Mobile Alliance
SGW: Serving Gateway
UE: User Equipment
UMTS: Universal Mobile Telecommunications System
UTRAN: UMTS Terrestrial Radio Access Network or Universal Terrestrial Radio Access Network Terms The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
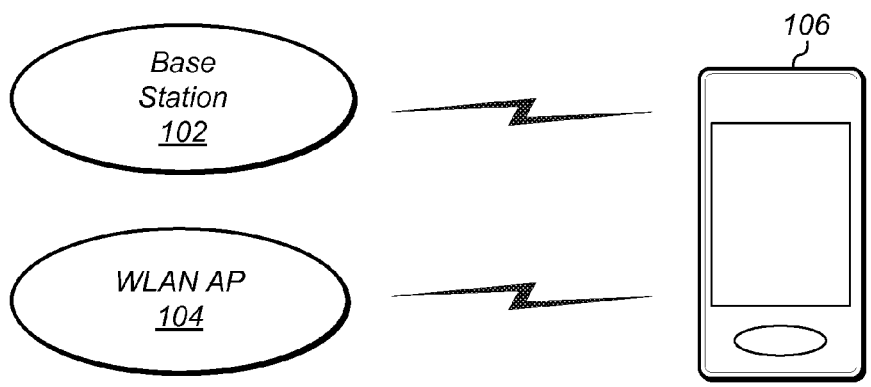
FIG. 2 illustrates a base station (BS) and a wireless local area network access point (WLAN AP) in communication with a user equipment (UE) device.
Figure 3:
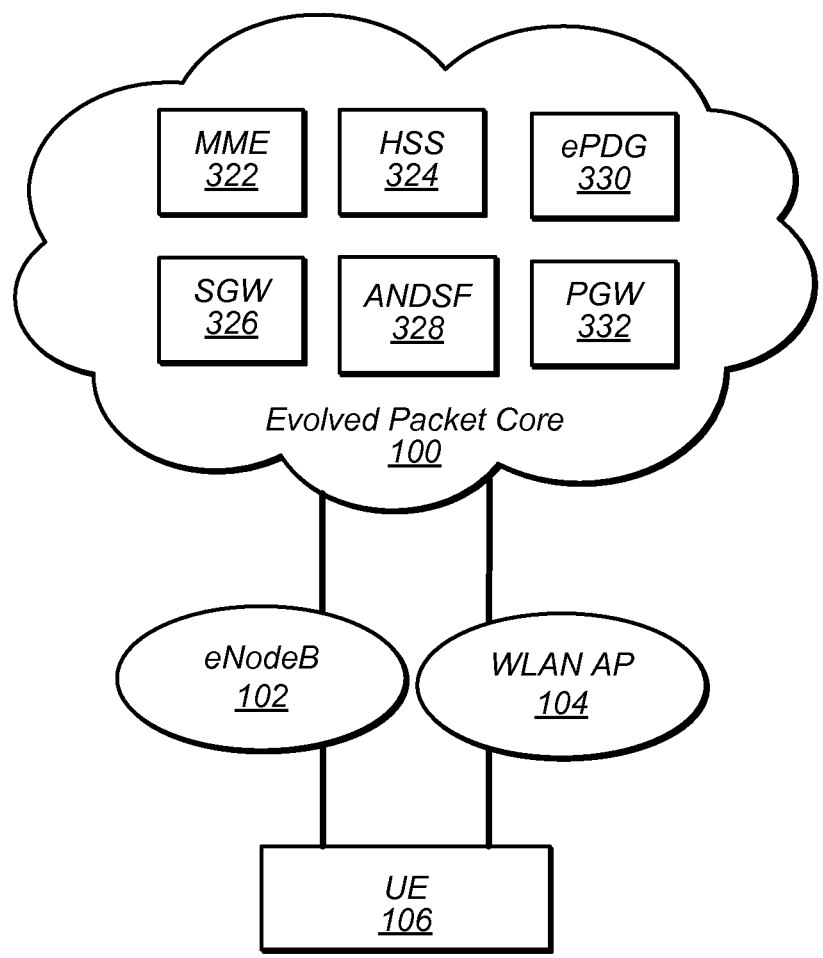
FIG. 3 illustrates an exemplary (and simplified) cellular network architecture.

FIGS. 1-3—Communication System

FIG. 1 illustrates an exemplary (and simplified) wireless communication scenario involving multiple communication systems. It is noted that FIG. 1 is merely one example of possible systems, and embodiments disclosed herein may be implemented in any of various systems, as desired.

As shown, the exemplary wireless communication scenario includes a cellular communication system represented by base station 102A and a wireless local area network (WLAN) represented by access point (AP) 104A.

The cellular communication system includes a base station 102A which communicates over a transmission medium with one or more user devices 106A, 106B, etc. Each of the user devices 106 may be referred to herein as a "user equipment" (UE). Thus, the user devices 106 are referred to as UEs or UE devices. Only two UE devices 106A and 106B are shown in FIG. 1 for ease of illustration.

The base station 102A may be a base transceiver station (BTS) or cell site, and may include hardware that enables wireless communication with the UEs 106A and 106B. The base station 102A may also be equipped to communicate with a network 100 (e.g., a core network of a cellular service provider, a telecommunication network such as a public switched telephone network (PSTN), a WLAN, and/or the Internet, among various possibilities). Thus, the base station 102A may facilitate communication between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), WiMAX, etc.

Base station 102A and other similar base stations (such as base stations 102B . . . 102N) operating according to the same or a different cellular communication standard may thus be provided as a network of cells, which may provide continuous or nearly continuous overlapping service to UEs 106A-B and similar devices over a wide geographic area via one or more cellular communication standards.

Thus, while base station 102A may act as a "serving cell" for UEs 106A-B as illustrated in FIG. 1, each UE 106 may also be capable of receiving signals from (and possibly within communication range of) one or more other cells (which might be provided by base stations 102B-N and/or any other base stations), which may be referred to as "neighboring cells". Such cells may also be capable of facilitating communication between user devices and/or between user devices and the network 100.

In addition to communicating with base station 102A, one or more of the UEs 106 may also be capable of communicating with a WLAN AP 104A, also known as a "hotspot." Thus, the WLAN AP 104A may facilitate communication between the devices and the network 100. The WLAN AP 104A and the UEs 106 may be configured to communicate over the transmission medium using any of various RATs, such as Wi-Fi, etc.

UEs 106 may be capable of dynamically transitioning between communicating with base station 102A over the cellular network and WLAN AP 104A over the WLAN. For example, UE 106A may, while in communication with base station 102A, perform seamless and/or non-seamless offload for some IP flows to WLAN AP 104A. Thus, for example, if the user is conducting a browsing session, the data packets may initially be conveyed over the cellular network over LTE. However, the UE 106A may at some point decide to offload some or all of the data packets onto the WLAN through WLAN AP 104A. This offloading decision may be based at least partly on charging information, as discussed further below.

FIG. 2 illustrates user equipment (UE) 106 (e.g., one of the devices 106A or 106B) in communication with a base station 102 (e.g., one of the base stations 102A through 102N) for communication on a cellular network and a WLAN AP 104 (e.g., one of the WLAN APs 104A through 104B) for communication on a WLAN. The UE 106 may be a device with cellular communication capability and WLAN communication capability, such as a mobile phone, a hand-held device, a computer or a tablet, or virtually any type of wireless device, as defined above.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

As noted above, the UE 106 may be configured to communicate using any of multiple cellular RATs. For example, the UE 106 may be configured to communicate using one or more of GSM, CDMA2000, LTE, or LTE-A. The UE 106 may also be capable of communication over a WLAN. Other combinations of wireless communication technologies are also possible.

FIG. 3 illustrates an exemplary, simplified portion of a wireless communication scenario involving multiple communication systems, such as a 3GPP compliant cellular network and a WLAN.

As shown, a UE 106 may be in communication with a base station, shown in this exemplary embodiment as an eNodeB 102. In turn, the eNodeB may be coupled to a core network, shown in this exemplary embodiment as an evolved packet core (EPC) 100. As shown, the EPC 100 may include mobility management entity (MME) 322, home subscriber server (HSS) 324, serving gateway (SGW) 326, access network discovery and selection function (ANDSF) 328, evolved packet data gateway (ePDG) 330, and PDN (packet data network) gateway (PGW) 332. The EPC 100 may include various other devices and/or entities known to those skilled in the art as well.

As shown, the UE 106 may also, or alternatively, be in communication with a WLAN AP 104. The WLAN AP 104 may, in turn, be coupled to the EPC 100, e.g. by utilizing the ePDG 330. This allows the UE 106 to communicate over either of the cellular network or the WLAN network to transmit and receive data packets with other UEs.

Figure 4:
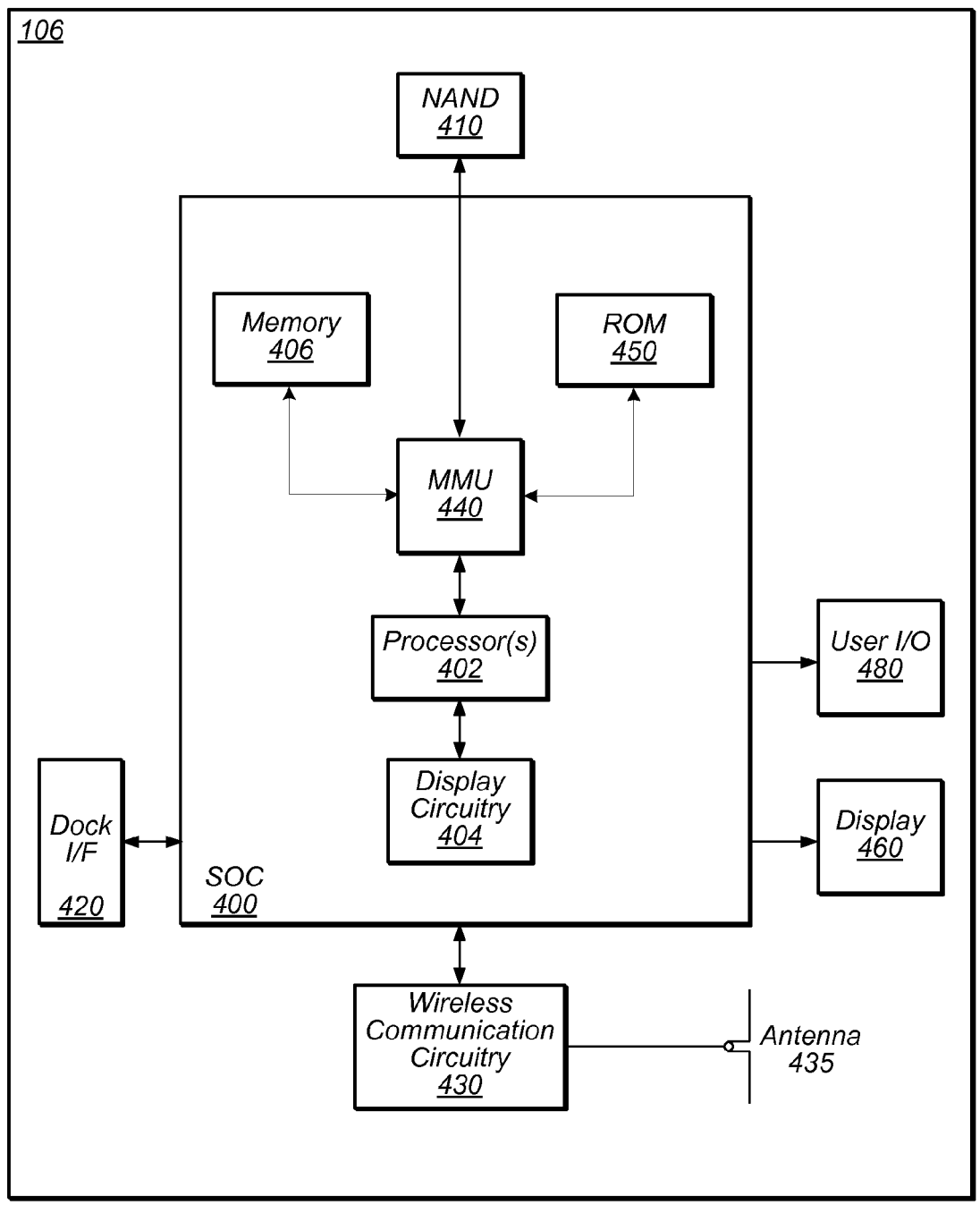
FIG. 4 illustrates an exemplary block diagram of a UE.

FIG. 4—Exemplary Block Diagram of a UE

FIG. 4 illustrates an exemplary block diagram of a UE 106. As shown, the UE 106 may include a system on chip (SOC) 400, which may include portions for various purposes. For example, as shown, the SOC 400 may include processor(s) 402 which may execute program instructions for the UE 106 and display circuitry 404 which may perform graphics processing and provide display signals to the display 460. The processor(s) 402 may also be coupled to memory management unit (MMU) 440, which may be configured to receive addresses from the processor(s) 402 and translate those addresses to locations in memory (e.g., memory 406, read only memory (ROM) 450, NAND flash memory 410) and/or to other circuits or devices, such as the display circuitry 404, wireless communication circuitry 430, connector I/F 420, and/or display 460. The MMU 440 may be configured to perform memory protection and page table translation or set up. In some embodiments, the MMU 440 may be included as a portion of the processor(s) 402.

As also shown, the SOC 400 may be coupled to various other circuits of the UE 106. For example, the UE 106 may include various types of memory (e.g., including NAND flash 410), a connector interface 420 (e.g., for coupling to a computer system, dock, charging station, etc.), the display 460, wireless communication circuitry 430 (e.g., for LTE, CDMA2000, Bluetooth, WiFi, etc.), and user I/O 480 (e.g., user input devices such as a touch screen, keyboard, etc.; and user output devices such as speakers, haptic feedback generators, etc.).

As noted above, the UE 106 may be configured to communicate wirelessly using multiple wireless communication technologies. As further noted above, in such instances, the wireless communication circuitry 430 may include radio components which are shared between multiple wireless communication technologies and/or radio components which are configured exclusively for use according to a single wireless communication technology. As shown, the UE device 106 may include at least one antenna (and possibly multiple antennas, e.g., for MIMO and/or for implementing different wireless communication technologies, among various possibilities), for performing wireless communication with cellular base stations and/or other devices. For example, the UE device 106 may use antenna 435 to perform the wireless communication.

As described further subsequently herein, the UE 106 may include hardware and software components for implementing part or all of the methods described herein. The processor 402 of the UE device 106 may be configured to implement part or all of the features described herein, e.g., by executing program instructions stored on a memory medium (e.g., a non-transitory computer-readable memory medium). Alternatively (or in addition), processor 402 may be configured as a programmable hardware element, such as an FPGA (Field Programmable Gate Array), or as an ASIC (Application Specific Integrated Circuit). Alternatively (or in addition) the processor 402 of the UE device 106, in conjunction with one or more of the other components 400, 404, 406, 410, 420, 430, 435, 440, 450, 460 may be configured to implement part or all of the features described herein.

Figure 5:
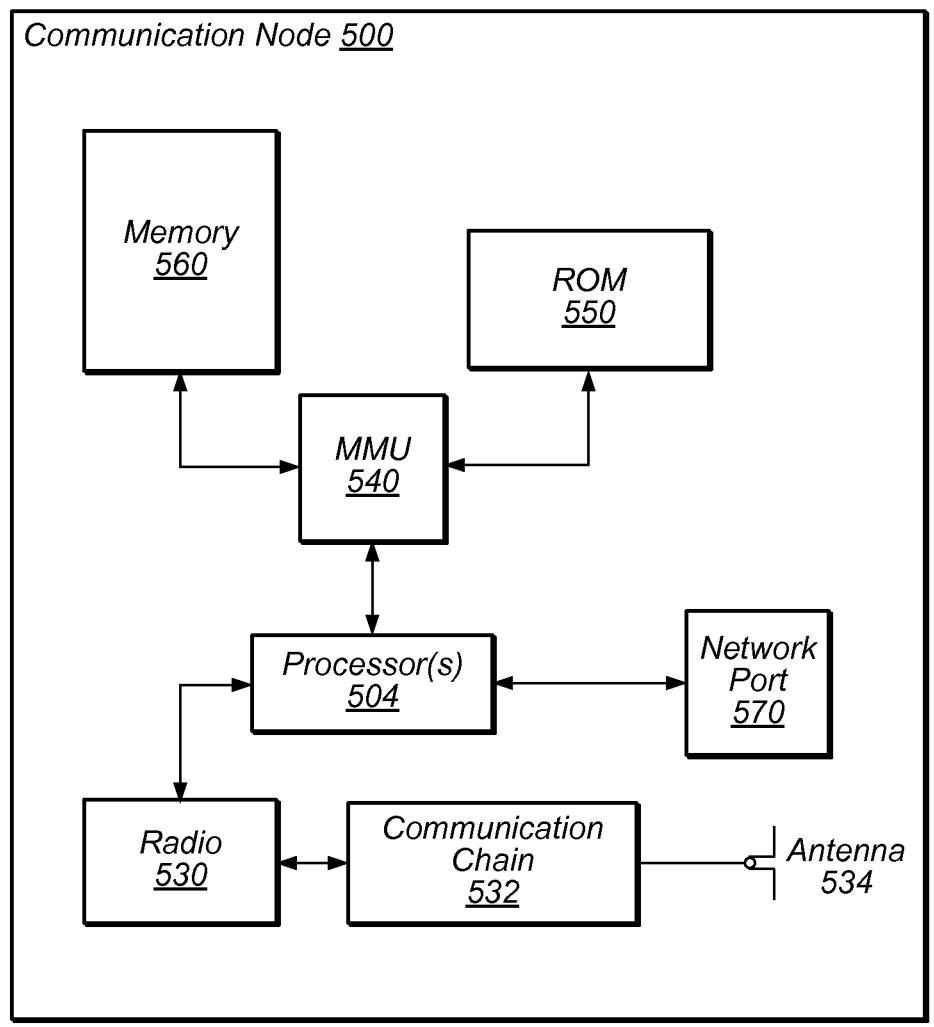
FIG. 5 illustrates an exemplary block diagram of a communication node, such as a BS or WLAN AP.

FIG. 5—Communication Node

FIG. 5 illustrates an exemplary block diagram of a communication node 500. In various embodiments, the communication node 500 may represent either a base station 102 or a WLAN AP 104. It is noted that the base station of FIG. 5 is merely one example of a possible communication node. As shown, the communication node 500 may include processor(s) 504 which may execute program instructions for the communication node 500. The processor(s) 504 may also be coupled to memory management unit (MMU) 540, which may be configured to receive addresses from the processor(s) 504 and translate those addresses to locations in memory (e.g., memory 560 and read only memory (ROM) 550) or to other circuits or devices.

The communication node 500 may include at least one network port 570. The network port 570 may be configured to couple to a telephone network and provide a plurality of devices, such as UE devices 106, access to the telephone network as described above.

The network port 570 (or an additional network port) may also or alternatively be configured to couple to a cellular network, e.g., a core network of a cellular service provider. The core network may provide mobility related services and/or other services to a plurality of devices, such as UE devices 106. In some cases, the network port 570 may couple to a telephone network via the core network, and/or the core network may provide a telephone network (e.g., among other UE devices serviced by the cellular service provider).

The network port 570 (or an additional network port) may also or alternatively be configured to couple to a local network, such as a home network or an enterprise network. For example port 570 may be an Ethernet port. The local network may provide connectivity to additional networks, such as the Internet.

The communication node 500 may include at least one antenna 534. The at least one antenna 534 may be configured to operate as a wireless transceiver and may be further configured to communicate with UE devices 106 via wireless communication circuitry 530. The antenna 534 communicates with the wireless communication circuitry 530 via communication chain 532. Communication chain 532 may be a receive chain, a transmit chain or both. The wireless communication circuitry 530 may be configured to communicate via various wireless communication technologies, including, but not limited to, LTE, LTE-A, GSM, WCDMA, CDMA2000, Wi-Fi, etc.

The processor(s) 504 of the communication node 500 may be configured to implement part or all of the methods described herein, e.g., by executing program instructions stored on a memory medium (e.g., a non-transitory computer-readable memory medium). Alternatively, the processor 504 may be configured as a programmable hardware element, such as an FPGA (Field Programmable Gate Array), or as an ASIC (Application Specific Integrated Circuit), or a combination thereof.

Figure 6:
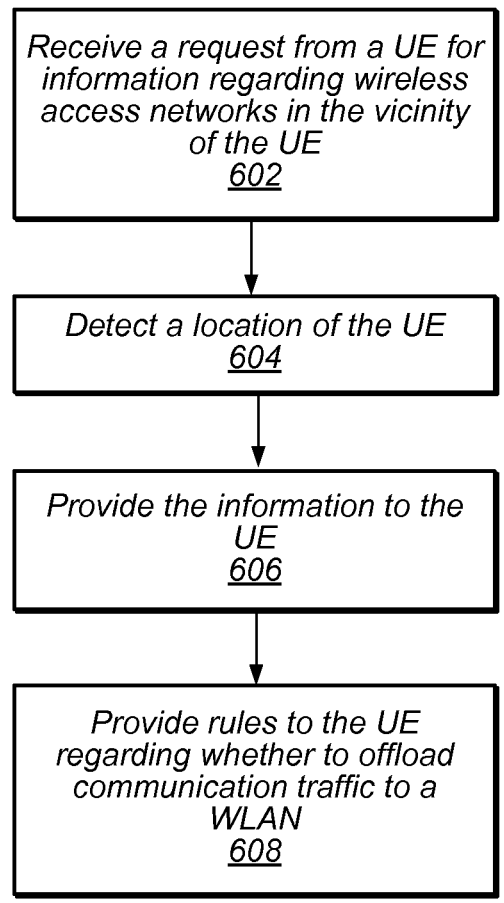
FIG. 6 is a flowchart diagram illustrating an exemplary method for providing charging data for use in offloading determinations.

FIG. 6—Providing Charging Data for Use in Offloading Determinations

FIG. 6 is a flowchart diagram illustrating a method for providing charging data for use in offloading determinations. The method shown in FIG. 6 may be used in conjunction with any of the systems or devices shown in the above Figures, among other devices. In some embodiments, the method of FIG. 6 may be performed by the EPC 100 of a mobile communication network. More specifically, in some embodiments the method of FIG. 6 may be performed by the ANDSF 328 of FIG. 3. In various embodiments, some of the method elements shown may be performed concurrently, in a different order than shown, or may be omitted. Note also that additional method elements may also be performed as desired. The method may be performed as follows.

As shown, in 602, a request may be received from a UE, such as the UE 106 of FIGS. 1-4, for information regarding wireless access networks in the vicinity of the UE. For example, the request may be received at the ANDSF 328 via a base station, such as the eNodeB 102 of FIG. 3. The term "wireless access network" may include both cellular networks and WLANs. Here the UE 106 may be communicating data over a cellular network, e.g., using LTE, and may make a request to see if the UE 106 is in range of any additional wireless access networks for possible offloading of these packets from the cellular network to another wireless access network.

In 604, a location of the UE 106 may be detected. For example, in some embodiments, the UE 106 may provide its location to the ANDSF 328 or to other entities within the mobile communication network. In other embodiments, the mobile communication network may be capable of determining the location of the UE 106, e.g. using other techniques known in the art.

In 606, the information regarding wireless access networks in the vicinity of the UE 106 may be provided to the UE 106. In some embodiments, the information may be provided to the UE 106 in response to the request received from the UE 106 in 602. Alternatively, or additionally, the information may be provided to the UE 106 without a request from the UE 106. For example, the ANDSF 328 may provide the information based on network triggers or as a result of previous communication with the UE 106.

In some embodiments, such as embodiments wherein a wireless access network is a HotSpot 2.0 (HS2.0) compatible WLAN, the provided information may comprise a PreferredRoamingPartnerList listing the preferred roaming partner list by an operator of the mobile communication network, e.g., as defined in the Hotspot 2.0 (Release 2) Technical Specification. In other embodiments, such as embodiments wherein a wireless access network is a WLAN that is not HS2.0 compatible, the provided information may comprise a PreferredSSIDList listing the preferred radio access network identifiers (e.g. the SSID of a WLAN) by the operator of the mobile communication network. In some embodiments, the provided information may further comprise additional information regarding the wireless access networks in the vicinity of the UE 106, such as the access technology type, e.g. WLAN, WiMAX; other technology specific information, e.g. one or more carrier frequencies; and/or validity conditions, i.e. conditions indicating when the provided access network discovery information is valid (such conditions may include, e.g., a location).

The provided information may further comprise charging data regarding wireless access networks in the vicinity of the UE 106. Specifically, the information may comprise charging data regarding a WLAN in the vicinity of the UE 106. In some embodiments, the operator of the mobile communication network may be unable to provide exact information about the applied charging rules. For example, a 3GPP EPC may allow application servers to dynamically control the charging rules of the services they deliver. In addition, charging for various IP flows may also depend on traffic steering rules provided by the ANDSF, like Inter-System Routing Policy (ISRP). For example, if ISRP includes rules for non-seamless WLAN Offload (NSWO), the user may not be charged at all for traffic subject to NSWO but charged for EPC-routed traffic traversing via the operator's core network.

Figure 10:
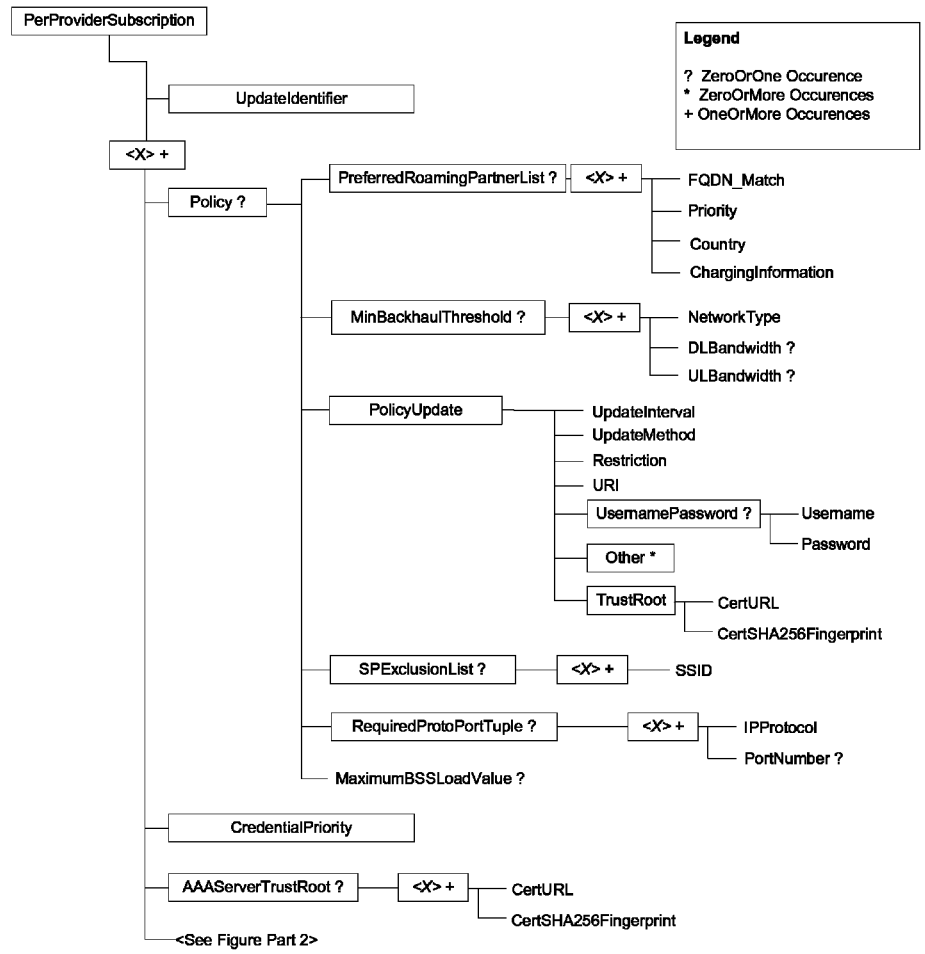
FIG. 10 is a graphical representation of a portion of the PerProviderSubscription management object.

However, in some embodiments, the provided charging data may comprise high-level guidelines regarding charging principles for data offloaded from the cellular communication network to one or more (e.g., each) of the wireless access networks in the vicinity of the UE 106. For example, in one possible embodiment, the high-level guidelines may comprise data specifying whether billing of traffic offloaded from the mobile communication network to the first WLAN will fall into one of three categories: free, home, or roaming. In this example, the "free" category may indicate that the user will incur no data transfer costs for data offloaded from the cellular communication network to the specified WLAN. The "home" category may indicate that data offloaded from the cellular communication network to the specified WLAN will incur costs according to a wireless data plan relating to use of a home network. E.g., the data transfer may be billed according to the same fee structure that would be used to transfer the data over the user's home cellular network. The "roaming" category may indicate that data offloaded from the cellular communication network to the specified WLAN will incur costs according to a wireless data plan relating to use of a visited network. E.g., the data transfer may be billed according to the same fee structure that would be used to transfer the data over a cellular network in which the user is roaming. In some embodiments, the charging data may comprise a ChargingInformation character string node, or other node, for each entry in a PreferredRoamingPartnerList node or a PreferredSSIDList node. For example, the ChargingInformation node may be configured to specify "Free"/"Home"/"Roaming". FIG. 10 is a graphical representation of a portion of a PerProviderSubscription management object, as defined in the HS2.0 Rel-2 specification, and updated to include a ChargingInformation node as a leaf of the PreferredRoamingPartnerList node.

Figure 11:
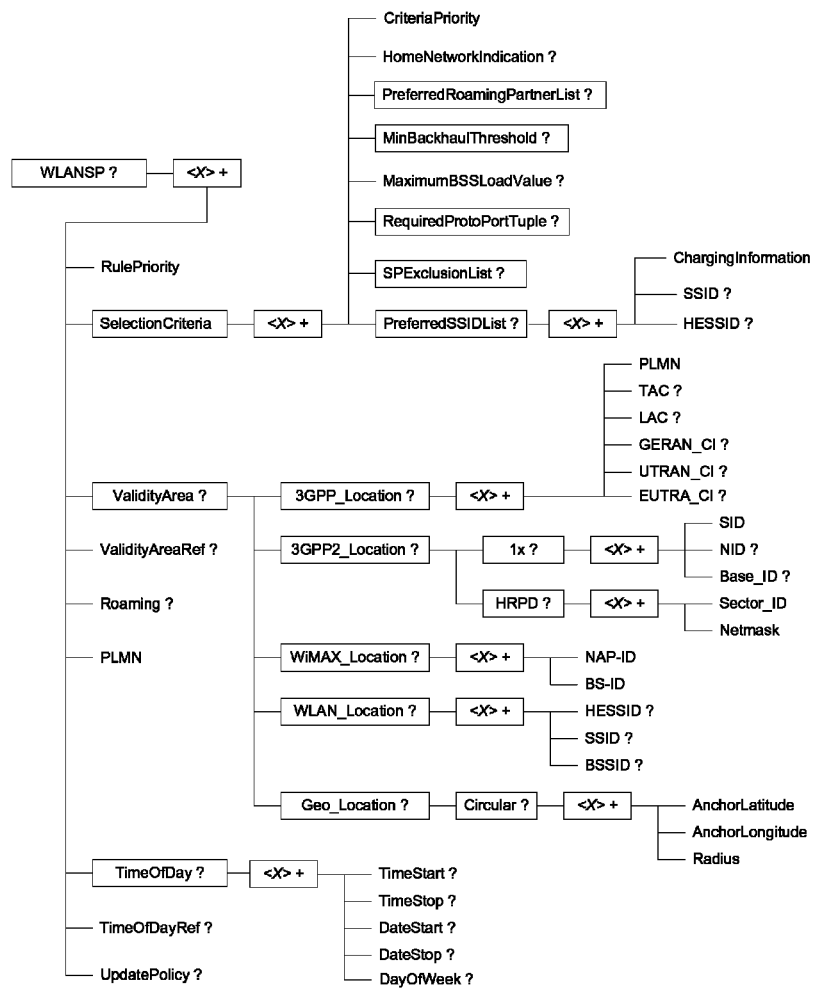
FIG. 11 is a graphical representation of a portion of the ANDSF management object relating to WLAN selection policy (WLANSP).

In 608, rules may be provided to the UE 106 regarding whether to offload communication traffic to a WLAN. In some embodiments, the rules may be provided to the UE 106 in response to a request received from the UE 106. Alternatively, or additionally, the information may be provided to the UE 106 without a request from the UE 106. For example, the ANDSF 328 may provide the information based on network triggers or as a result of previous communication with the UE 106. The rules may be included in the information provided in 606, or may be provided separately. In some embodiments, the provided rules may include the WLAN Selection Policy (WLANSP), as defined in connection with the ANDSF by 3GPP TS 23.402 v 12.8.0, incorporated by reference above. Specifically, the WLANSP is a set of operator-defined rules that determine how the UE 106 selects and reselects a WLAN access network. The UE 106 may be provided with WLANSP rules from multiple networks. FIG. 11 is a graphical representation of a portion of an ANDSF management object relating to a WLANSP, as defined by 3GPP TS 24.312 v 12.8.0, and updated to include a ChargingInformation node as a leaf of the PreferredSSIDList node. In some embodiments, other rules may also be provided, such as Inter-System Mobility Policy (ISMP), Inter-System Routing Policy (ISRP), Inter-APN Routing Policy (IARP), etc.

In some embodiments, the provided rules may include validity conditions, i.e., conditions indicating when the provided rule is valid, such as the time of day, geolocation, network location, etc. The provided rules may also include a list of SSIDs not preferred for selection, such as the SPExclusionList defined in the HS2.0 Rel-2 specification. The provided rules may also include WLAN selection criteria in priority order. In some embodiments the selection criteria may be based on one or more of the following attributes of a wireless access network: PreferredRoamingPartnerList, MinimumBackhaulThreshold, MaximumBSSLoad, RequiredProtoPortTuple, PreferredSSIDList, and ChargingInformation. As one example, a WLANSP rule may include the following groups of selection criteria:

Group of selection criteria with priority 1:
PreferredRoamingPartnerList=partner1.com, partner2.com
MaximumBSSLoad=60
Group of selection criteria with priority 2:
PreferredSSIDList=myoperator
MinimumBackhaulThreshold=2 Mbps in the downlink
ChargingInformation=Free A WLAN may meet a group of selection criteria when it concurrently fulfills all the criteria in the group.

In some embodiments, the provided rules may incorporate some or all of the information regarding wireless access networks, such as the charging data for one or more networks. For example, the provided rules may comprise an ordered list of networks in preference order. The ordered list may be generated, e.g., by the ANDSF, by applying the information to various selection criteria. The ordered list may thus inform the UE regarding the most preferred networks, in light of the information.

Figure 7:
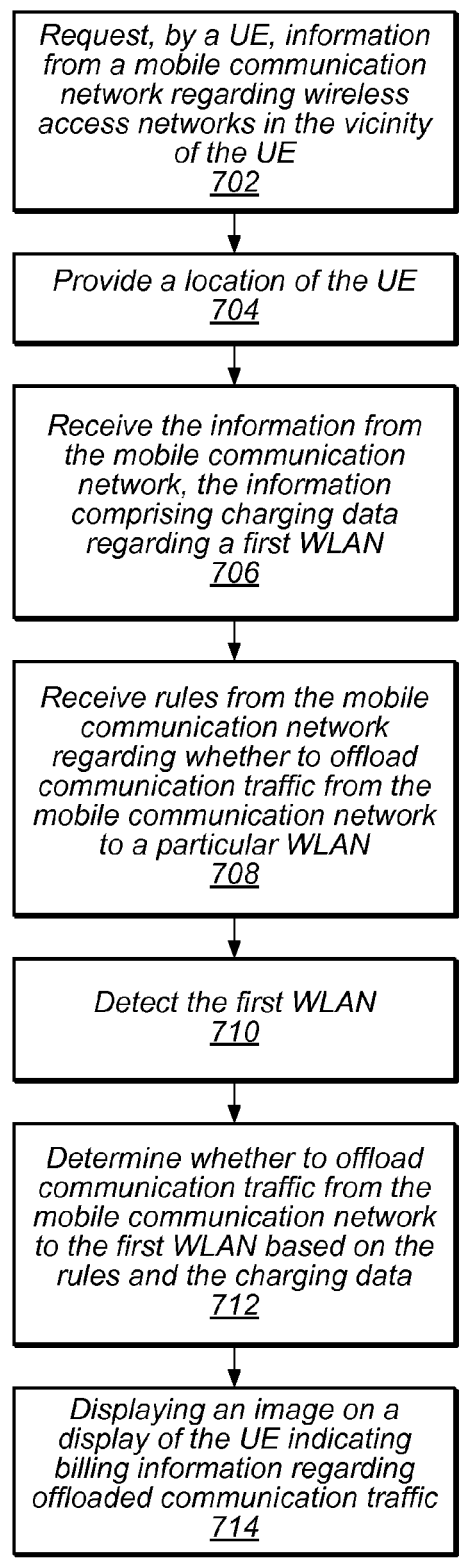
FIG. 7 is a flowchart diagram illustrating an exemplary method for making offloading determinations using charging data.

FIG. 7—Making Offloading Determinations Using Charging Data

FIG. 7 is a flowchart diagram illustrating a method for making offloading determinations using charging data, such as the charging data received as described above in FIG. 6. The method shown in FIG. 7 may be used in conjunction with any of the systems or devices shown in the above Figures, among other devices. In some embodiments, the method of FIG. 7 may be performed by the UE 106 of FIGS. 1-4. In various embodiments, some of the method elements shown may be performed concurrently, in a different order than shown, or may be omitted. Note also that additional method elements may also be performed as desired. The method may be performed as follows.

As shown, in 702, the UE 106 may request information from a mobile communication network regarding wireless access networks in the vicinity of the UE 106. For example, in some embodiments the UE 106 may request the information from an ANDSF, such as the ANDSF 328 of FIG. 3.

In 704, the UE 106 may provide its location. The UE 106 may provide its location based on GPS coordinates from its built-in GPS system, or using other techniques. In response to the UE 106 requesting information on available wireless access networks in 702 and providing its location in 704, the method of FIG. 6 may operate as described above.

In 706, The UE 106 may receive the requested information from the mobile communication network. For example, in some embodiments the UE 106 may receive the information from the ANDSF 328. The received information may comprise information according to any of the embodiments described above with regard to FIG. 6. For example, the information may comprise charging data regarding wireless access networks in the vicinity of the UE 106. More specifically, the information may comprise charging data regarding at least a first WLAN in the vicinity of the UE 106.

In 708, the UE 106 may receive rules from the mobile communication network regarding whether to offload communication traffic from the cellular communication network to a particular WLAN. For example, in some embodiments the UE 106 may receive the rules from the ANDSF 328. The received rules may comprise rules according to any of the embodiments described above with regard to FIG. 6.

In 710, the UE 106 may detect the first WLAN. In other words, the UE 106 may detect the presence of the WLAN hotspot that acts as the interface to the first WLAN.

In 712, the UE 106 may determine whether to offload communication traffic from the cellular communication network to the first WLAN based at least in part on the received rules. For example, in some embodiments, the received rules may comprise an ordered list of networks in preference order, wherein the list was generated by applying at least the charging data to various selection criteria. In this example, the UE may determine whether to offload communication traffic from the cellular communication network to the first WLAN by determining that the first WLAN is listed as preferred over the cellular communication network, and that the first WLAN is presently available to offload communication traffic.

The determination may be further based on the charging data regarding the first WLAN. For example, in some embodiments, the UE 106 may apply the charging data regarding the first WLAN to the received rules to determine whether the WLAN is preferable over the cellular communication network in light of the charging data.

The determination may be further based on user preferences. Such user preferences may be stored in memory on the UE 106. In some embodiments, the user preferences may take precedence over the received rules.

For example, the UE 106 may determine which rules are currently met for each of the wireless access networks in the vicinity of the UE 106, in light of the received information regarding wireless access networks in the vicinity of the UE 106. The UE 106 may further determine a priority based on the met rules. The UE 106 may then select a most preferable available wireless access network based on the determined priorities and/or the user preferences. For example, in one possible scenario, the user preferences may specify that any WLAN with charging data ChargingInformation=Free is preferable to the cellular communication network (e.g., a connection to the EPC via an eNodeB). In another possible scenario, the user preferences may specify that the cellular communication network is preferable to any WLAN with charging data ChargingInformation=Roaming. If the first WLAN is determined to be preferable to the cellular communication network, then the UE 106 may offload communication traffic from the cellular communication network to the first WLAN.

In 714, the UE 106 may display an image on a display of the UE 106 indicating billing information regarding traffic offloaded by the UE to the first WLAN.

Figure 8:
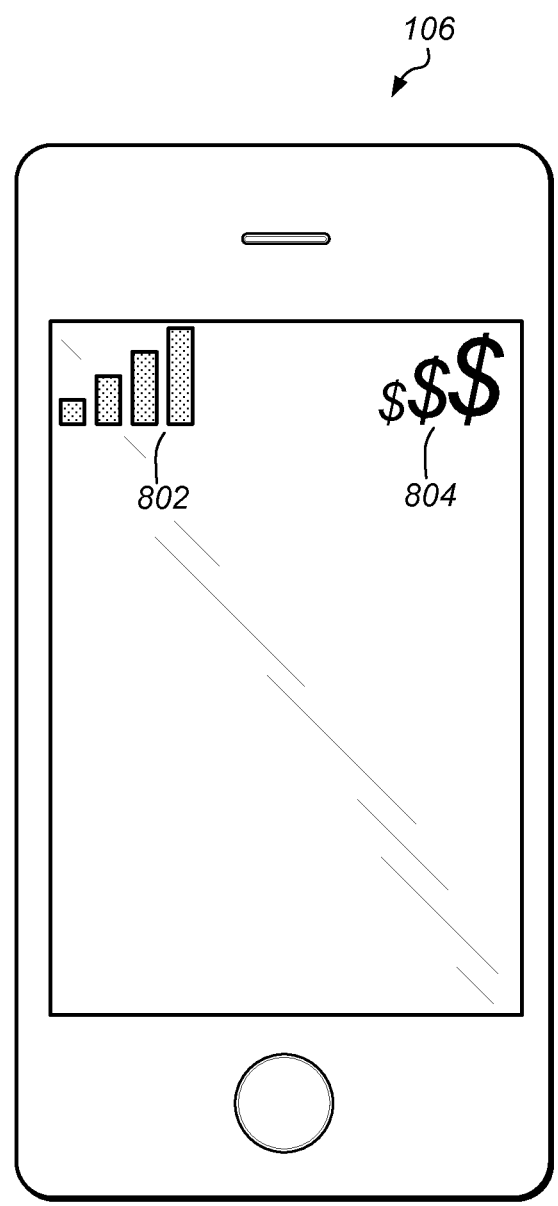
FIG. 8 illustrates an exemplary display of a UE, including an image indicating charging data for a WLAN.

FIG. 8 shows an example screenshot of the display of UE 106, which displays an image 804 indicating billing information on the display. Other embodiments comprising different or additional icons, graphics or other images are also contemplated. Non-graphical indicators, such as audio or haptic indicators, are also contemplated.

In the example shown, the screen of the UE 106 displays an image (or icon) 802 that may indicate signal strength of a communication signal being received by the UE 106, as is known in the art. For example, the number of bars shown, filled, etc. in image 802 may indicate the strength of the received signal, with a larger number of bars being presented indicating a stronger signal.

The screen of the UE 106 may also display an image (or icon) 804 which indicates the cost of communication traffic transferred over the first wireless access network. The image may comprise a number of dollar signs which are presented based on the charging cost currently being incurred. For example, the image 804 may reflect at least a subset of the received charging data regarding a first WLAN. For example, in one embodiment, display of only the single leftmost dollar sign may indicate that the received charging data for the first WLAN is "Free"; i.e., the user will incur no data transfer costs for data offloaded from the cellular communication network to the first WLAN. Similarly, display of the left two dollar signs (the smaller dollar sign and the medium dollar sign) may indicate that the received charging data for the first WLAN is "Home", meaning that the charging cost for use of the first WLAN is roughly similar to that of the home cellular network. Display of all three dollar signs (display of the small medium and large dollar signs) may indicate that the received charging data for the first WLAN is "Roaming", and hence the cost is according to the same fee structure that would be used to transfer the data over a cellular network in which the user is roaming.

Thus the three dollar sign icons shown in image 804 of the screenshot may operate to convey current charging information to the user, much like the conventional power bars in image 802 present information on current signal strength.

Any of various types of images or icons may be used to present current charging information. In another embodiment, each of the dollar sign icons are the same size, and the number of dollar signs that are "lit up" or "filled in" indicate the amount of charging.

Providing to the user the information indicating the cost of communication traffic transferred over the first wireless access network may be advantageous to the cellular network operator, e.g., to facilitate traffic management and/or to improve the user experience. For example, in locations where demand for network service is high, the cellular network operator may benefit from offloading communication traffic of various UEs to WLANs, to reduce demand on the cellular network. Similarly, in locations where the cellular network signal is weak, the user experience may be improved by offloading communication traffic to WLANs having a stronger signal. To this end, the cellular network operator may create a WLAN in such locations, or may partner with existing WLAN providers, such as subscription-based providers. Thus, providing to the UE 106 the charging information regarding as many available WLANs as possible, as well as rules for selecting the WLANs based on the charging data, may facilitate offloading that is advantageous to the cellular network operator.

However, if the user observes that the UE 106 has connected to a WLAN he does not recognize, and particularly to a subscription-based WLAN, the user may manually override the network selection described above to reconnect to the cellular network, so as to avoid incurring unwanted WLAN usage charges. This user behavior may thus frustrate the traffic management efforts of the cellular network operator. However, this behavior may be avoided by providing to the user the information indicating the cost of communication traffic transferred over the WLAN. For example, the user may have no incentive to override the network selection described above if he is informed that no additional cost will be incurred through use of the selected WLAN.

In one embodiment, the image 804 may be used to present the charging information of a WLAN even if the UE 106 is not currently using this WLAN. Thus the image 804 may be used to present "potential" charging information of a nearby WLAN, thus allowing the user to make intelligent decisions regarding how (on which network) his data is transmitted/received. The presentation of this charging information to the user may be very useful in enabling the user to intelligently manage the costs of his data sessions on the UE 106.

In some embodiments, the UE 106 may allow the user 106 to change the user preferences in response to the image indicating billing information. For example, while the UE 106 displays the image indicating billing information regarding the first WLAN, the user may provide input to the UE 106 indicating a desire or instruction to offload communication traffic from the cellular communication network to the first WLAN. In response to the input, the UE may offload the communication traffic to the first WLAN. Alternatively, in response to the input, the UE may evaluate the rules received from the ANDSF 328, e.g., as in step 712 of FIG. 7.

In other embodiments, the UE 106 may prompt the user to authorize offloading of communication traffic from the cellular communication network to the first WLAN before connecting to the first WLAN, e.g., during or following step 712 of FIG. 7, wherein the image indicating billing information is displayed in connection with the prompting. For example, the UE 106 may prompt the user to authorize offloading to any WLAN for which the charging data is not "Free", or for which the charging data indicates a higher charging rate than the present cellular or WLAN connection. In response to the prompting, the user may authorize offloading of communication traffic to the first WLAN via a user input of the UE 106.

Figure 9:
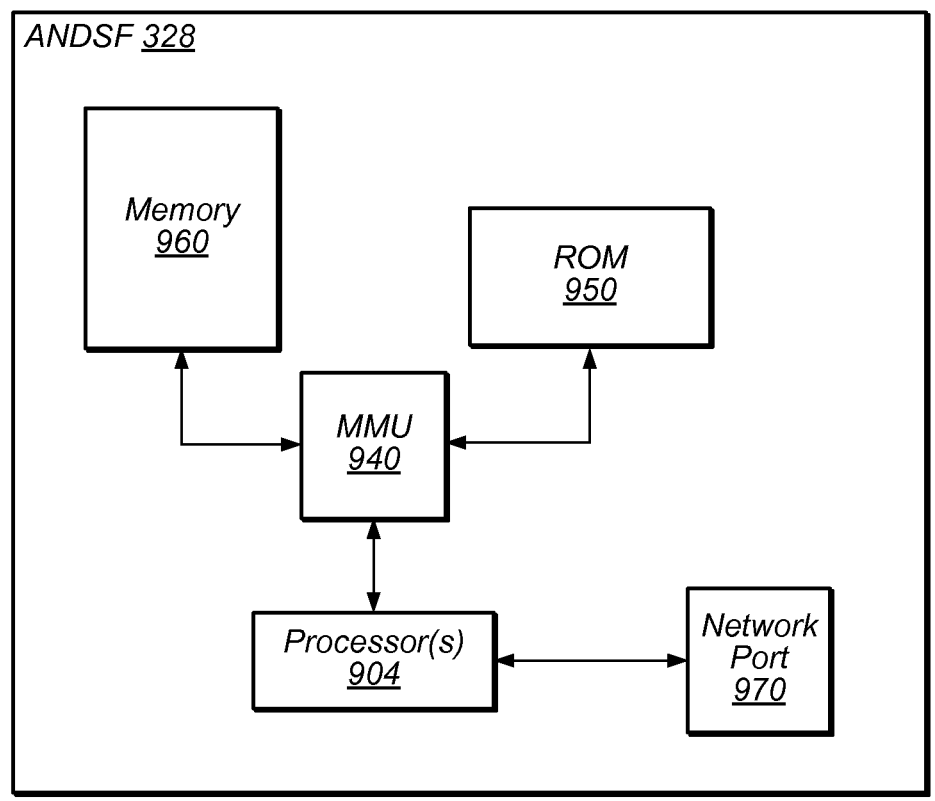
FIG. 9 illustrates an exemplary block diagram of a Access Network Discovery and Selection Function (ANDSF)

FIG. 9—Access Network Discovery and Selection Function

FIG. 9 illustrates an exemplary block diagram of an ANDSF entity 328. It is noted that the ANDSF 328 of FIG. 9 is merely one example of a possible ANDSF 328. As shown, the ANDSF 328 may include processor(s) 904 which may execute program instructions for the ANDSF 328. The processor(s) 904 may also be coupled to memory management unit (MMU) 940, which may be configured to receive addresses from the processor(s) 904 and translate those addresses to locations in memory (e.g., memory 960 and read only memory (ROM) 950) or to other circuits or devices.

The ANDSF 328 may include at least one network port 970. The network port 970 may be configured to couple to one or more base stations and/or other cellular core network entities and/or devices.

The ANDSF 328 may provide network discovery and selection assistance data, as per operators' policy, to a plurality of devices, such as UE devices 106. For example, the ANDSF 328 may be responsible for providing access network discovery information, including charging data, regarding wireless access networks to UE devices 106. The ANDSF 328 may also be responsible for providing rules to UE devices 106 regarding whether to offload communication traffic to a wireless access network. For example, the rules may include WLANSP, ISMP, ISRP, IARP, etc.

The ANDSF 328 may communicate with base stations (e.g., eNBs), such as base station 102 of FIGS. 1-3, and/or other core network entities/devices by means of any of various communication protocols and/or interfaces. As one example, in a 3GPP context, the MME 322 may use any of a PC2, PC3, PC4, PC6, PC7 and/or any of various other communication protocols or interfaces to communicate with other cellular network components.

The processor(s) 904 of the ANDSF 328 may be configured to implement part or all of the methods described herein, e.g., by executing program instructions stored on a memory medium (e.g., a non-transitory computer-readable memory medium). Alternatively, the processor 904 may be configured as a programmable hardware element, such as an FPGA (Field Programmable Gate Array), or as an ASIC (Application Specific Integrated Circuit), or a combination thereof.

Additional Embodiments

In the following paragraphs, further exemplary embodiments of the disclosure are presented.

A first exemplary embodiment provides a method for offloading communication traffic from a cellular communication network to a wireless local area network (WLAN). For example, the method may be performed by an Access Network Discovery and Selection Function (ANDSF) of a cellular core network. The method may comprise detecting a location of a user equipment (UE); providing information to the UE regarding one or more WLANs in the vicinity of the UE, wherein the information comprises charging data regarding the one or more WLANs; and providing one or more rules to the UE regarding whether to offload communication traffic from a cellular communication network to a WLAN, wherein the one or more rules specify behaviors based on the charging data.

In this exemplary embodiment, the method may further comprise receiving a request from the UE for the information, wherein the providing the information to the UE is in response to receiving the request.

In this exemplary embodiment, the one or more WLANs may be HotSpot 2.0 compatible networks. Additionally, the information provided to the UE may comprise at least one of: a list of preferred roaming partners; and a list of preferred radio access network identifiers. For example, the information may comprise a list of preferred roaming partners including WLANs that are HotSpot 2.0 compatible networks. The information may additionally, or alternatively, comprise a list of preferred radio access network identifiers including WLANs that are not HotSpot 2.0 compatible networks.

In this exemplary embodiment, the charging data may comprise data specifying whether billing of traffic offloaded from the cellular communication network to at least a first WLAN of the one or more WLANs will be: free, conducted according to a wireless data plan relating to use of a home network, or conducted according to a wireless data plan relating to use of a roaming network.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., base station 102, UE 106, ANDSF 328) may be configured to include a processor (or a set of processors) and a memory medium, where the memory medium stores program instructions, where the processor is configured to read and execute the program instructions from the memory medium, where the program instructions are executable to cause the device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for offloading communication traffic from a cellular communication network to a wireless local area network (WLAN), comprising:
   by a user equipment (UE) in communication with the cellular communication network:
   receiving information from the cellular communication network regarding one or more WLANs in the vicinity of the UE, wherein the information comprises charging data regarding a first WLAN of the one or more WLANs;
   receiving one or more rules from the cellular communication network regarding whether to offload communication traffic from the cellular communication network to a particular WLAN based on charging data relating to the particular WLAN;
   detecting the first WLAN;
   determining whether to offload communication traffic from the cellular communication network to the first WLAN based at least in part on the one or more rules;
   determining that the charging data regarding the first WLAN indicates that a charging rate associated with the first WLAN based at least in part on the one or more rules;
   displaying on a display of the UE a request for user authorization to offload communication traffic from the cellular communication network to the first WLAN, wherein displaying the request is in response to a charging rate indicated by the charging data; and
   receiving, via an input device of the UE, an instruction to offload the communication traffic from the cellular communication network to the first WLAN, wherein the instruction is responsive to the request for user authorization.

2. The method of claim 1, wherein the information and the rules are received from an Access Network Discovery and Selection Function (ANDSF) of a cellular communication network.

3. The method of claim 1, wherein the charging data regarding the first WLAN comprises data specifying whether billing of traffic offloaded from the cellular communication network to the first WLAN will be: free, conducted according to a wireless data plan relating to use of a home network, or conducted according to a wireless data plan relating to use of a roaming network.

4. The method of claim 1, wherein the information comprises at least one of:
   a list of preferred roaming partners; and
   a list of preferred radio access network identifiers.

5. The method of claim 1, wherein the determining whether to offload communication traffic from the cellular communication network to the first WLAN is further based on one or more user preferences regarding the charging data relating to the first WLAN, wherein the one or more user preferences are stored in a memory of the UE.

6. The method of claim 1, further comprising:
   displaying an image on a display of the UE, wherein the image indicates at least a subset of the charging data relating to the first WLAN.

7. The method of claim 1, wherein the displaying the image is in response to determining to offload the communication traffic from the cellular communication network to the first WLAN, wherein the instruction is required to authorize the UE to offload the communication traffic from the cellular communication network to the first WLAN.

8. The method of claim 1, further comprising:
   offloading the communication traffic from the cellular communication network to the first WLAN in response to receiving the instruction.

9. A wireless user equipment (UE), comprising:
   a display;
   an input device;
   one or more radios, coupled to one or more antennas configured for wireless communication via at least one cellular communication network and at least one wireless local area network (WLAN); and
   a processing element operably coupled to the one or more radios, the input device, and the display, the processing element configured to cause UE to:
   receive, via the one or more radios, information from a cellular communication network regarding one or more WLANs in the vicinity of the UE, wherein the instruction comprises charging data regarding the one or more WLANs;
   receive one or more rules from the cellular communication network regarding whether to offload communication traffic from the cellular communication network to a particular WLAN based on charging data relating to the particular WLAN;
   detect a first WLAN of the one or more WLANs;
   determine whether to offload communication traffic from the cellular communication network to the first WLAN based at least in part on the one or more rules;
   display, on the display, a request for user authorization to offload communication traffic from the cellular communication network: to the first WLAN, wherein displaying the request is in response to a charging rate indicated by the charging data; and
   receive, via the input device, an instruction to offload the communication traffic from the cellular communication network to the first WLAN, wherein the instruction is responsive to the request for user authorization.

10. The UE of claim 9, wherein the charging data regarding the one or more WLANs comprises data specifying whether billing of traffic offloaded from the cellular communication network to the first WLAN will be: free, conducted according to a wireless data plan relating to use of a home network, or conducted according to a wireless data plan relating to use of a roaming network.

11. The UE of claim 9, wherein the charging data relating to the one or more WLANs comprises charging data relating to the first WLAN, wherein the determining whether to offload communication traffic from the cellular communication network to the first WLAN is further based on one or more user preferences regarding the charging data relating to the first WLAN, wherein the one or more user preferences are stored in a memory of the UE.

12. The UE of claim 9,
wherein the processing element is further configured to cause the UE to display an image on the display, wherein the charging data relating to the one or more WLANs comprises charging data relating to the first WLAN, wherein the image indicates at least a subset of the charging data relating to the first WLAN.

13. The UE od claim 9, wherein the displaying the image is in response to determining to offload the communication traffic from the cellular communication network to the first WLAN, wherein the instruction is required to authorize the UE to offload the communication traffic from the cellular communication network to the first WLAN.

14. The UE of claim 9, wherein the processing element is further configured to cause the UE to offload the communication traffic from the cellular communication network to the first WLAN in response to receiving the instruction.

15. A non-transitory computer-readable memory medium comprising program instructions executable by a processor of a user equipment (UE) to cause the UE to:
receive information from a cellular communication network regarding one or more wireless local area networks (WLANs) in the vicinity of the UE, wherein the information comprises charging data regarding a first WLAN of the one or more WLANs;
receive one or more rules from the cellular communication network regarding whether to offload communication traffic from the cellular communication network to a particular WLAN based on charging data relating to the particular WLAN;
detect the first WLAN;
determine whether to offload communication traffic from the cellular communication network to the first WLAN based at least in part on the one or more rules;
display on a display of the UE a request for user authorization to offload communication traffic from the cellular communication network to the first WLAN, wherein displaying the request is in response to a charging rate indicated by the charging data; and
receive, via an input device of the UE, an instruction to offload the communication traffic from the cellular communication network to the first WLAN, wherein the instruction is responsive to the request for user authorization.

16. The non-transitory computer-readable memory medium of claim 15, wherein the charging data regarding the one or more WLANs comprises data specifying whether billing of traffic offloaded from the cellular communication network to the first WLAN will be: free, conducted according to a wireless data plan relating to use of a home network, or conducted according to a wireless data plan relating to use of a roaming network.

17. The non-transitory computer-readable memory medium of claim 15, wherein the determining whether to offload communication traffic from the cellular communication network to the first WLAN is further based on one or more user preferences regarding the charging data relating to the first WLAN, wherein the one or more user preferences are stored in a memory of the UE.

18. The non-transitory computer-readable memory medium of claim 15, wherein the program instructions are further executable to cause the UE to:
display an image on a display of the UE, wherein the image indicates at least a subset of the charging data relating to the first WLAN.

19. The non-transitory computer-readable memory medium of claim 15, wherein the program instructions are further executable to cause the UE to:
offload the communication traffic from the cellular communication network to the first WLAN in response to receiving the instruction.

* * * * *